United States Patent [19]

Callen et al.

[11] Patent Number: 4,706,010
[45] Date of Patent: Nov. 10, 1987

[54] LINEAR SOLAR ARRAY VOLTAGE CONTROL SYSTEM

[75] Inventors: Patrick J. Callen; John D. Bingley, both of Yardley, Pa.; Richard A. Newell, Fair Haven, N.J.

[73] Assignee: RCA Corporation, Princeton, N.J.

[21] Appl. No.: 905,513

[22] Filed: Sep. 10, 1986

[51] Int. Cl.$^4$ ............................ H02J 7/00; G05F 1/46
[52] U.S. Cl. ........................................ 323/225; 323/906
[58] Field of Search ........................ 323/225, 271–272, 323/299, 906; 320/2, 39

[56] References Cited

U.S. PATENT DOCUMENTS

| | | | |
|---|---|---|---|
| 3,896,368 | 7/1975 | Rym | 323/224 |
| 3,956,687 | 5/1976 | Lindenman | 323/225 |
| 4,186,336 | 1/1980 | Weinberg et al. | 323/906 X |
| 4,306,183 | 12/1981 | Wright | 320/39 |

FOREIGN PATENT DOCUMENTS 0123020 7/1984 Japan ................................. 323/225

OTHER PUBLICATIONS

O'Sullivan et al., "Developments in Modular Spacecraft Power Conditioning for Application Satellites", Proceedings of the 13th Intersociety Energy Conversion Engineering Conference, San Diego, CA, USA (Aug. 20–25, 1978).

Primary Examiner—Peter S. Wong
Attorney, Agent, or Firm—Clement A. Berard, Jr.; Raymond E. Smiley

[57] ABSTRACT

A voltage regulator for controlling the voltage of a bus powered by N solar cell arrays. Digital shunts are coupled to N−1 of the arrays. A linear shunt is coupled to the remaining array. Current passing through the remaining array is sensed by the linear shunt which, in response thereto, turns on and off various ones of the digital shunts to maintain the desired voltage on the bus.

6 Claims, 3 Drawing Figures

LINEAR SOLAR ARRAY VOLTAGE CONTROL SYSTEM

BACKGROUND OF INVENTION

1. Field of Invention

This invention relates to a solar array voltage controller system and particularly to such a solar array voltage controller involving linear control of the voltage array power bus.

2. Description of the Prior Art

A typical solar cell powered bus involves a plurality of solar cell arrays connected in parallel between a power bus and return bus (ground). In the absence of a voltage controller, the voltage level of the power bus will be at a wide range of values depending on the efficiency of the solar cells (which decreases over time), with different temperature conditions, different illumination conditions and under different load conditions. The purpose of a voltage controller system is to maintain a constant voltage or desirably near constant voltage at the power bus in spite of the above-mentioned problems which work to create varying voltage.

Various shunting structures to maintain the constant voltage are known. Some are digital, meaning that the bus voltage is maintained within a range of voltages. Some are linear, such that the bias voltage is maintained precisely but with a considerable hardware cost and weight. (In artificial satellites, where such solar cells are often employed, weight is a problem.) In one type of linear arrangement, a plurality of bipolar transistor and dissipating resistor combinations are placed in parallel between the power bus and the common bus. Excess power is dissipated in the transistors and resistors. In another parallel regulation system, the transistors are connected between tap points of respective arrays and the return bus. With such a partial shunt system, no collector dissipation resistors are involved. With the partial shunt, the various transistors are turned on and off, thus lowering the voltage across the part of each array being shunted by its respective transistor and, thus adjusting the power bus voltage to the desired value. The partial shunt is, in most respects, superior to the full shunt. A full shunt must dissipate array current at full bus potential while the partial shunt dissipates equivalent current at the lower voltage of only a portion of each array across which the transistors are placed. The disadvantage to the above described voltage controllers is in high total dissipation even though the dissipation is somewhat less with the partial shunt systems. Because of the high dissipation, large weight heat sinking structures are required.

SUMMARY OF THE INVENTION

In a solar cell power bus arrangement including a power bus, a return bus and a plurality of N solar cell arrays arranged in parallel between the power bus and return bus, a voltage regulator for maintaining a desired voltage between the power bus and return bus, comprises in combination, digital means including N−1 switches connected respectively between N−1 of the arrays and the return bus, a switch, when switched on, fully shunting at least a portion of its associated array and linear shunt means coupled between the remaining one of the N arrays and the return bus for measuring the current passing through the remaining array. The linear shunt is also coupled to the digital means. The linear shunt, in response to the level of the current, switches on or off various ones of the shunt switches connected to said N−1 arrays and linearly shunts the remaining array to maintain the desired voltage between the power bus and return bus.

DETAILED DESCRIPTION OF THE PREFERRED EMBODIMENTS

Figure 1:
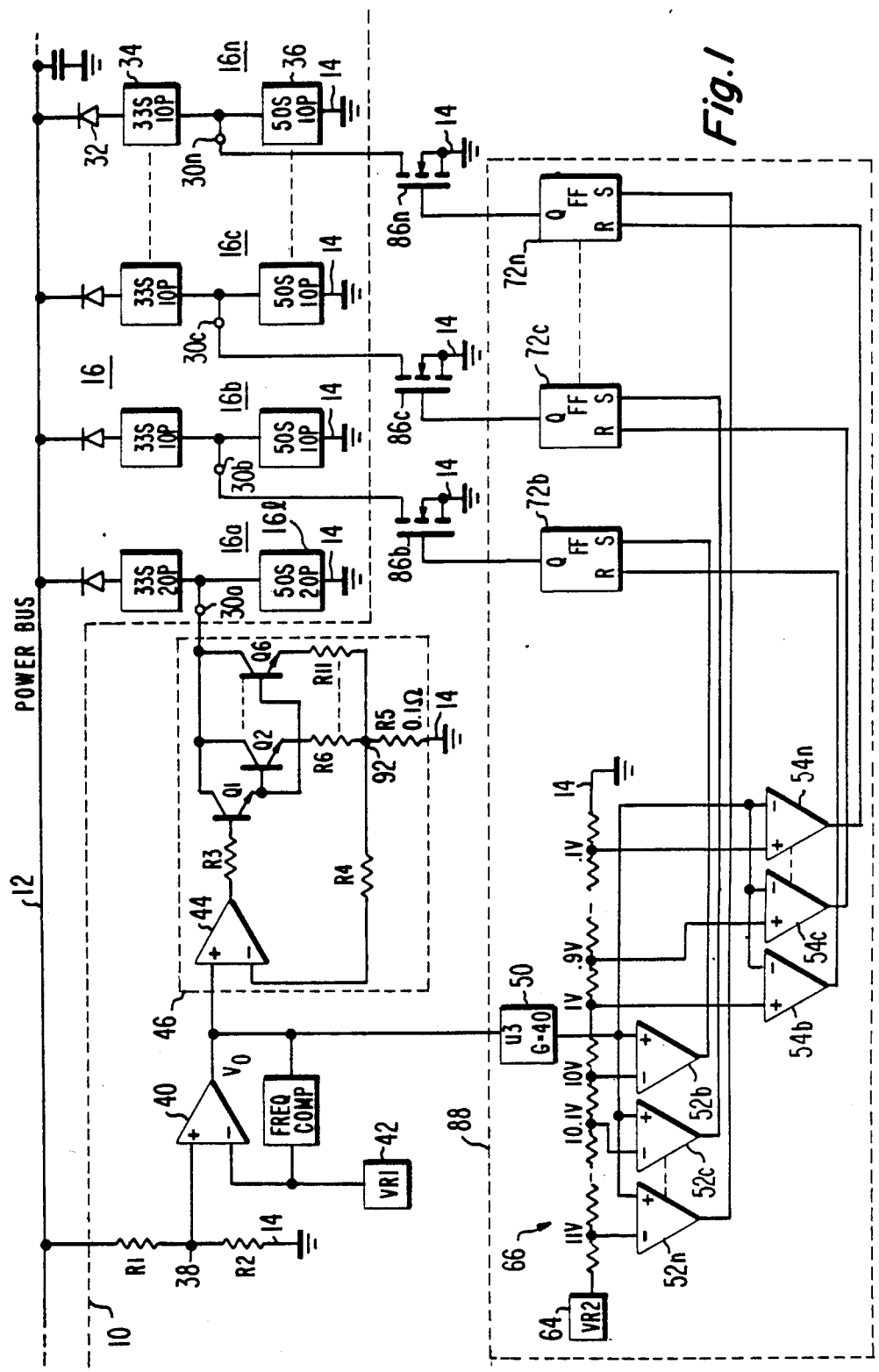
FIG. 1 is a first voltage regulator circuit in accordance with a preferred embodiment of the present invention for maintaining a constant voltage on a solar array.

Referring now to FIG. 1, everything below and to the left of dashed line 10 is part of a voltage regulator circuit in accordance with a preferred embodiment of the invention. Everything to the right and above dashed line 10 is part of the solar cell power generation system. Typically, the solar cell power generation system includes a common power bus 12 to which various power using loads (not shown) are connected, a return bus illustrated as ground symbols 14 throughout FIG. 1 (rather than as a single wire) and a plurality N of solar arrays arranged in parallel between bus 12 and the return bus. By way of example, four such arrays $16a$, $16b$, $16c$ and $16n$ are illustrated. A typical number for N might be 16 or 32.

Figure 3:
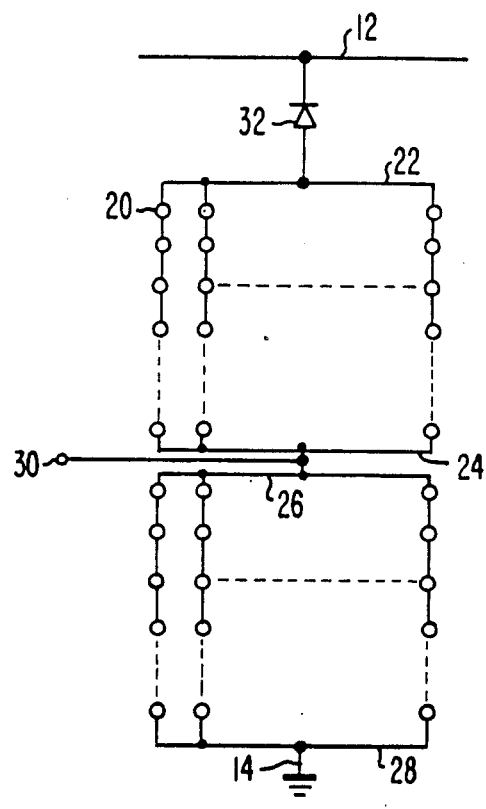
FIG. 3 illustrates a typical solar cell array used in conjunction with the voltage control circuit of FIGS. 1 and 2.

FIG. 3 to which attention is now directed, illustrates a solar cell array in more detail. Each circle such as 20 represents a solar cell. The array is divided into an "upper" section between bus 22 and bus 24 and a "lower" section between bus 26 and bus 28. A tap point 30 connects together the two busses 24 and 26. Bus 22 is connected to the anode of a diode 32, the cathode of which is connected to bus 12. Bus 28 is connected to the return bus 14. With reference to the "upper" section, the solar cells are arranged in X parallel strings of Y series connected solar cells; where, for example, X may be 10 and Y may be 33. There would thus be 10 columns of solar cells each column containing 33 cells in series connected between bus 22 and bus 24. For the "lower" section, there may be 10 parallel rows for example each containing 50 cells in series. When illuminated, the solar array produces a positive voltage at the anode of diode 32 relative to the voltage at return bus 14.

Referring back to FIG. 1 and with reference for example to solar array $16n$, it contains an upper section 34 connected through diode 32 to bus 12 and a lower section 36 connected to ground 14. A tap point 30 connects to the upper and lower sections 34 and 36 respectively. The numbers within the upper section box 34 and lower section box 36 represent the number of parallel and series connections above described in connection with FIG. 3.

With reference now to the voltage controller, a voltage divider network comprising resistors R1 and R2 connects between bus 12 and return bus 14. The juncture 38 of resistors R1 and R2 is connected to the noninverting (plus) input of an operational amplifier 40 while a voltage reference source 42 is coupled to the inverting (minus) input thereof. The output of amplifier 40 is connected to a linear partial shunt section of the voltage controller, specifically to operational amplifier 44 contained within dashed box 46. The output of amplifier 40 is also coupled to the input of a voltage amplifier 50 having an exemplary gain of 20 to 40. The output of amplifier 50 is coupled to the plus inputs of comparator amplifiers 52b, 52c and 52n and to the minus inputs of comparator amplifiers 54b, 54c and 54n. The letters b, c and n relate to those same letters in the solar arrays 16. A voltage reference source 64 couples through a resistive divider network 66 to return bus 14.

Various tap points on the divider are connected to minus inputs of amplifiers 52n, 52c and 52b and to the plus inputs of amplifiers 54b, 54c and 54n.

The outputs of amplifiers 52b, 52c and 52n respectively are coupled to the set(S) inputs of flip-flops 72b, 72c and 72n respectively while the outputs of amplifiers 54b, 54c and 54n respectively are coupled to respective reset (R) inputs of flip-flops 72b, 72c and 72n respectively. The Q outputs of flip-flops 72b, 72c and 72n respectively are connected to respective gate inputs of power metal oxide semiconductor field effect transistors (MOSFET) 86b, 86c and 86n respectively. The sources of MOSFETs 86b, 86c and 86n are connected to bus 14 while the respective drains are coupled to the tap points 30b, 30c and 30n of solar arrays 16b, 16c and 16n respectively.

The linear shunt section within dashed box 46 is basically a transconductance amplifier comprising operational amplifier 44 and the Darlington arrangement of transistor Q1 and a set of five transistors Q2 . . . Q6 connected in parallel (only two of which, Q2 and Q6, are shown). Base resistor R3 extends between the output of amplifier 44 and the base of transistor Q1. The emitters of NPN transistors Q2 . . . Q6 are connected respectively via emitter resistors R6 . . . R11 to a common point 92. Feedback from point 92 through resistor R4 is provided to the inverting input of amplifier 44. A current sensing resistor R5 connects between common point 92 and return bus 14. Resistor R5 is typically of a very small value such as 0.1 ohms. Resistor R5 measures the current in the path that includes the lower section of array 16a transistor Q1–Q6, resistors R6–R11 and resistor R5. Because of the nature of the transconductance amplifier in block 46, the output voltage of amplifier 50 is directly proportional to the current through resistor R5. The closed loop transfer function for the combination of amplifier 44 and Q1–Q6 is 1/R5. The voltage out of amplifier 40, $V_0$, also appears across R5 and the resulting current through R5 ($V_0/R5$) or $I_{R5}/V_0$ which is the transfer function of the linear shunt section within block 46.

In the description that follows it will be assumed that the desired power bus 12 voltage is 35 volts relative to return bus 14, that VR1 is set to 10 volts, that VR2 is set to 18 volts, that R1 is 25 kilohms and that R2 is 10 kilohms. These are only exemplary values. With such exemplary values, the values at various points along the voltage divider 66 are listed.

Operation of comparators 52, comparators 54, flip-flops 72 and transistors 86 is as follows. When the voltage at the +terminal of any comparator 52 is greater than the voltage at the −terminal, the output is a relatively high positive voltage. Conversely, when the −terminal is at a greater voltage than the +terminal, the output is a relatively low positive voltage. A negative-to-positive transition at the S terminal of a flip-flop 72 causes the flip-flop to become set (Q output at a relatively high voltage). A negative-to-positive transition at the R terminal of flip-flop 72 causes the flip-flop to become reset (Q output at a relatively low voltage). The set state of a flip-flop 72 causes its associated transistor 86 to be turned "on". Resetting of the flip-flop causes its associated transistor 86 to be turned "off". When a transistor is "on", it has a very low impedance between its drain and source terminals, thus, shunting or shorting out the associated lower section of a solar array 16. When a transistor is "off", it has a very high impedance between its drain and source terminals.

It will now be assumed that the solar cells proceed in order from a position where they receive no or little sunlight to a position where they receive a very bright light to a position where they receive little or no light. This situation may happen because the solar cells are mounted on part of an artificial satellite system (not shown) rotating about the earth or because the solar cells are on earth and the earth is rotating relative to the sun such as during periods of daylight hours and night hours. It should be understood that this is merely an example because the same phenomenon would occur if a heavy load was placed between busses 12 and 14 or removed therefrom.

Therefore, with no light directed toward the solar arrays, the voltage at point 38 will be at or near zero volts and certainly below the ten volts applied to the −terminal of amplifier 40. As a result, the impedance across transistors Q2–Q6 is very high such that no shunting action occurs between terminal 30a of array 16a at the return bus 14. That is, lower array section 16l is not shunted Further, all flip-flops 72 are reset and all transistors 86 are off so that no shunting occurs on any of the arrays 16.

As the arrays 16 receive more and more light, point 38 rises to higher and higher voltages eventually reaching 10 volts as power bus 12 rises to 35 volts. As the solar cells receive even more light, and therefore the voltage at bus 12 tends to rise above 35 volts, the output of amplifier 40 becomes positive and Q2–Q6 become more and more conductive causing ever increasing shunting to occur across the lower part 16l of solar array 16a and, therefore, causing an ever increasing current through resistor R5 to maintain bus 12 at 35 volts. As the solar cells receive even more light, transistors Q2–Q6 reach a point near saturation when they are fully conductive and, thus, fully shunting lower array 16l. Other things being equal, therefore, a further increase of light striking the arrays would cause the voltage on bus 12 to increase above 35 volts. However, the voltage from amplifier 50 increases, reaching and surpassing 10 volts. At that time, comparator 52b produces a high output which sets flip-flop 72b turning on transistor 86b and, therefore, fully shunting the lower portion of array 16b.

When array 16b is shunted, the voltage on bus 12 drops below 35 volts. The transistors Q2–Q6 are made nonconductive and current passage through resistor R5 decreases to near 0.

Eventually, as more and more light strikes the arrays, near saturation again occurs in transistors Q2–Q6. The amplifier output of amplifier 50 rises above 10.1 volts causing flip-flop 72c to become set, which in turn causes transistor 86c to be turned on, thus shunting the lower section of array 16c. If still more sun reaches the arrays, then the process above described repeats with other sections being shunted out. Because of the linear nature of the linear shunt contained within block 46, the actual voltage output of power bus 12 (once enough light reaches the arrays to cause bus 12 to rise to 35 volts)

remains constant in spite of increases in light reaching the arrays or lessened loads being coupled to bus 12.

Now assume that the light reaching arrays 16 starts to decrease and continues to decrease to a position at which no light is reaching the arrays. First the shunting caused by linear shunt 46 will decrease near to the point to which no shunting occurs. Eventually, the voltage output of amplifier 50 will drop to and below one volt. At that time, comparator 54b produces a negative-to-positive voltage transition which resets flip-flop 72b causing transistor 86b to turn off, thus removing the shunt from the lower portion of array 16b. When that happens, the voltage on bus 12 tends to rise above 35 volts causing a positive voltage to be applied to amplifier 44 +terminal relative to that at the −terminal and the transistors Q2–Q6 are rendered conductive causing the full shunting action to occur on array 16l. As the light level continues to fall, in turn flip-flop 72c is reset and its associated transistor 86c is turned off resulting in the shunt being removed from the lower section of transistor array 16c. Finally, as the light once again becomes low enough such that the voltage output of amplifier 50 drops below 0.1 volts, the shunt is removed from array 16n.

The net effect is that so long as there is enough light to cause bus 12 to reach 35 volts, it will remain at 35 volts regardless of the amount of light reaching the solar arrays. Even though all the arrays except one, 16a, have digital shunting, that is the shunt is fully on or fully off, nevertheless due to the one linear shunt, that within block 46, a constant voltage is maintained at bus 12, over a wide range of light and load conditions.

By measuring the linear current through R5, the voltage control circuit is sensitive to the state of conduction of the linear shunt Q2–Q6, without having to measure the actual collector-to-emmiter voltage of Q2–Q6. The voltage across R5, when amplified by amplifier 50, becomes the basis for selecting which switch array sections 86 are on or off. If there is not sufficient overlap of the current output of the linear array section 16a, and that of any switched array section, 16b, 16c . . . 16n, the act of tuning on a switch 86 at one of the upper threshold voltages of divider 66 (say 10.1 volts) may cause the linear current to decrease to the point where the voltage analog of this current at point 92 (also appearing at the +and −inputs to amplifier 44) as amplified by amplifier 50, reaches the lower threshold voltage (0.9 volts for example) and the switched array sections are again switched off, the system could undesirably oscillate between the switched on and switched off states. Because of 20 parallel solar array chains in array 16a, as opposed to 10 parallel solar arrays chains in the remaining arrays, such problem does not occur.

Figure 2:
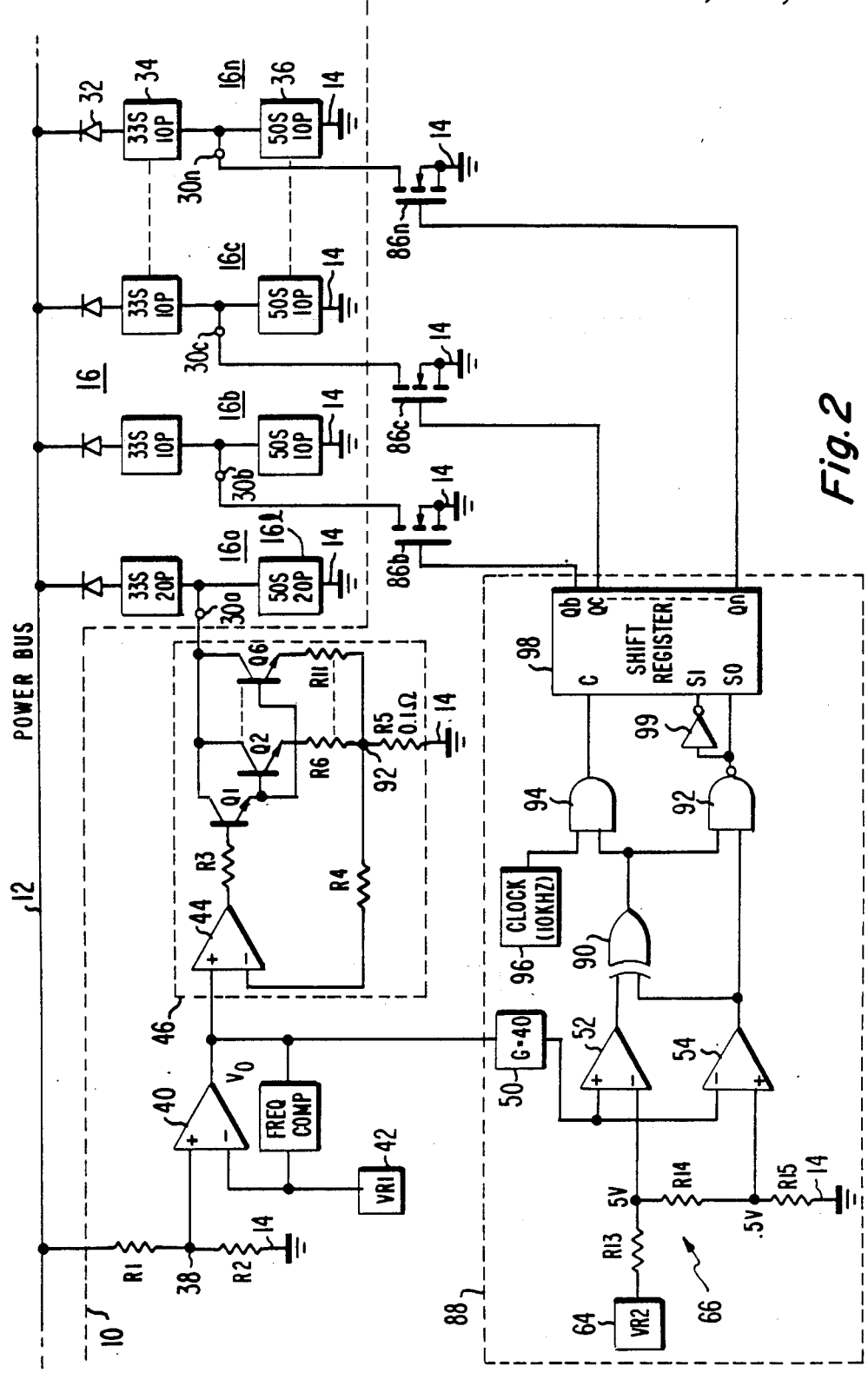
FIG. 2 is an alternative voltage regular circuit.

With reference to FIG. 2, the solar cell arrays 16, linear shunt section within block 46 and also the error amplifier section comprising amplifier 40 and voltage reference source 42 is the same as in FIG. 1. The digital comparator section comprising those elements within dashed block 88 do differ in some respects from the comparator elements within block 88 of FIG. 1. In particular, voltage divider chain 66 comprises only three series connected resistors R13, R14 and R15 coupled between voltage reference source 64 and return bus 14. There are only two comparators 52 and 54 for detecting when upper and lower current limits respectively are reached.

The output of upper current comparator 52 is coupled to one input of an exclusive OR gate 90 while the output of lower current comparator 54 is coupled to the second input of exclusive OR gate 90 and to one input of NAND gate 92. The output of exclusive OR gate 90 is coupled to one input of each of NAND gate 92 and AND gate 94. A clock 96 having an exemplary clock rate of 10 kilohertz is coupled to the second input of AND gate 94. The output of AND gate 94 is coupled to the clock (C) input of a shift register 98 while the output of NAND gate 92 is coupled directly to the S0 input of register 98 and via inverter 99 to the S1 input of shift register 98. S0 receives data signals while S1 receives signals indicative of shift direction. A high level on the S0 input to shift register 98 (low level on S1) causes shift register 98 to shift up, enabling switch 86b and subsequently switch 86c, etc., in sequence. Conversely, a low on S0 (high on S1) causes a shift downward. There are as many outputs of shift register 98 as there are switching transistors 86 such that one output is connected to a gate of an associated transistor 86.

Operation of the circuit of FIG. 2 is generally the same as that of FIG. 1 except with respect to the operation of the comparator section within block 88. The description of operation which follows assumes as with FIG. 1 that first no light reaches the solar cells arrays and then increasing light reaches the solar cells arrays and finally that less and less light reaches the solar cells arrays until none reaches the solar cell arrays. Therefore, transistors 86 are off and no shunting occurs on any of the solar cell arrays. Therefore, as more and more light reaches the solar cell arrays, eventually the linear section within dashed block 46 will reach near saturation and the voltage at the +input of comparator 52 will rise above that negative input 5 volts, by way of example. When this occurs, a +signal is sent to exclusive OR gate 90 causing its output to go high providing one high signal at each of AND gate 94 and NAND gate 92.

When the next momentary positive clock pulse occurs from clock source 96, AND gate 94 will be enabled providing a positive clock pulse to shift register 98. Further, because amplifier 54 produces a relatively low voltage, NAND gate 92 is disabled so that a relatively high signal is applied to the S0 input of shift register 98 and a relatively low signal is applied to the S1 input causing a shift in a direction to cause the relatively high signal to be outputted at $Q_b$. Shift register 98 in response to the clock pulse produces a relatively high signal at its $Q_b$ output causing transistor 86b to become conductive and shunting the lower portion of array 16b. Consequently, the near saturation of the linear amplifier within dashed block 46 ceases such that the linear amplifier section will be essentially opened removing the shunt from array 16a. As more and more light increases, eventually near saturation will again be reached in the linear section. Comparator 52 will produce a high signal, resulting ultimately in another shift of shift register 98 such that the $Q_c$ output becomes high causing transistor 86c to turn on and array 16c to be shunted. This procedure repeats as many times as necessary to maintain the desired voltage on power bus 12 with respect to power bus 14 under various light conditions and load (not shown) conditions.

As the light reaching the solar cells becomes lower and lower and thus it is desired to remove the shunts, when the linear section 46 reduces to a low amount of shunting and thus a low voltage signal appears to the output of amplifier 50, comparator 54 is turned on producing a relatively high output which passes through exclusive OR gate 90 to AND gate 94 and NAND gate 92. The next clock pulse from clock source 96 will cause a relatively high output from AND gate 94 to the clock input of shift register 98. This time, however, the NAND gate 92 is enabled because it is receiving both a relatively high output from exclusive OR gate 90 and a relatively high output from comparator 54. As a result, a relatively low signal is produced from the output of AND gate 92 to the S0 input of shift register 98 and a high signal to the S1 input thereof causing it to pass zeros to the $Q_b \ldots Q_n$ chain. Shifting will occur in the reverse direction causing zeros to be first applied to the last Q output of shift register 98 to have gone high and then, as further shifting occurs, eventually to $Q_b$ as light decreases. Again, although all shunts, but one, are digital, that one linear shunt ensures that accurate control is maintained over bus 12.

What is claimed is:

1. In a solar cell power bus arrangement including a power bus, a return bus and a plurality of N solar cell arrays arranged in parallel between the power bus and return bus, a voltage regulator for maintaining a desired voltage between the power bus and return bus, comprising in combination:

digital means including N−1 shunt switches connected respectively between N−1 of said arrays and said return bus, a switch, when switched on, fully shunting at least a portion of its associated array; and linear shunt means coupled between the remaining one of said N arrays and said return bus for measuring the current passing through said remaining array, said linear shunt also coupled to said digital means; and said digital means including means responsive to the level of said current for switching on or off various ones of the shunt switches connected to said N−1 arrays, said linear shunt linearly shunting said remaining array in an amount to maintain the desired voltage between said power bus and return bus.

2. The combination as set forth in claim 1 wherein said linear shunt means comprises a transconductance amplifier.

3. The combination as set forth in claim 1 wherein each of said shunt switches comprises a field effect transistor (FET) having source and drain terminals connected between said array and return bus.

4. The combination as set forth in claim 1 wherein each of said arrays includes the series connection of a first section and second section and a diode connected between said power bus and said return bus and wherein said shunt switches and linear shunt are connected respectively across the array sections which are connected to said return bus.

5. The combination as set forth in claim 3 wherein said FETs also include gate terminals and wherein said means for switching comprises for each said FET a flip-flop having an output connected to said FET gate terminal and a set input terminal and a reset input terminal and wherein said digital means further comprises a first comparator responsive to said current in said linear shunt for setting said flip-flop to thereby turn on said FET and cause said shunting action to occur and a second comparator also responsive to the current in said linear shunt being of a relatively low value coupled to said reset terminal of said flip-flop for resetting said flip-flop thereby turning off said associated FET to remove the shunt from its associated solar array.

6. The combination as set forth in claim 3 wherein each said FET also includes a gate terminal and wherein said digital means also comprises a shift register having N−1 outputs connected respectively to said gates of said N−1 transistors and further comprises means responsive to the current in said linear shunt to control the direction of shift of information in said shift register and the values of such said information to provide at the outputs of said shift register signals to control the condition of said FETs so as to cause shunting or nonshunting of said N−1 arrays.

* * * * *